United States Patent [19]

Brouwer

[11] 4,381,040
[45] Apr. 26, 1983

[54] WEIGHING SCALE WITH CAPACITOR TRANSDUCER

[75] Inventor: Frans Brouwer, Glencoe, Ill.

[73] Assignee: Pelouze Scale Co., Evanston, Ill.

[21] Appl. No.: 303,188

[22] Filed: Sep. 17, 1981

[51] Int. Cl.³ .............................................. G01G 3/14
[52] U.S. Cl. ......................... 177/210 C; 177/DIG. 9
[58] Field of Search ............. 177/210 C, 211, DIG. 9

[56] References Cited

U.S. PATENT DOCUMENTS

| 4,023,634 | 5/1977 | Provi et al. | 177/211 |
| 4,243,114 | 1/1981 | Brouwer | 177/210 C |
| 4,285,413 | 8/1981 | Dauge et al. | 177/210 C |

Primary Examiner—George H. Miller, Jr.

[57] ABSTRACT

A platform type weighing scale comprising a differential capacitor transducer having one double-segment movable plate attached to an elongated weighing beam and two double-segment fixed plates attached to a U-shaped channel. The weighing beam is housed within the cavity defined by the channel. The ends of both the weighing beam and the channel are fixed to tape-pulley supported structures to produce turning moments which move the center of the weighing beam in a vertical plane substantially more than the channel is moved in the same plane. This difference in the relative position of the weighing beam and channel translates into a weight responsive change in the relative position of the fixed and movable capacitor plates to produce a weight readout.

10 Claims, 11 Drawing Figures

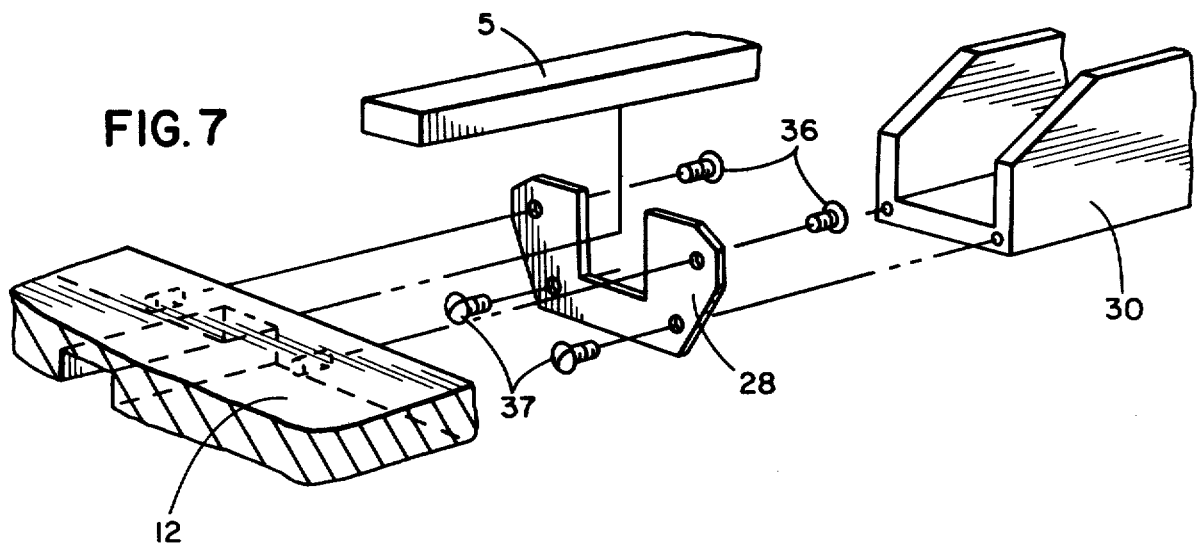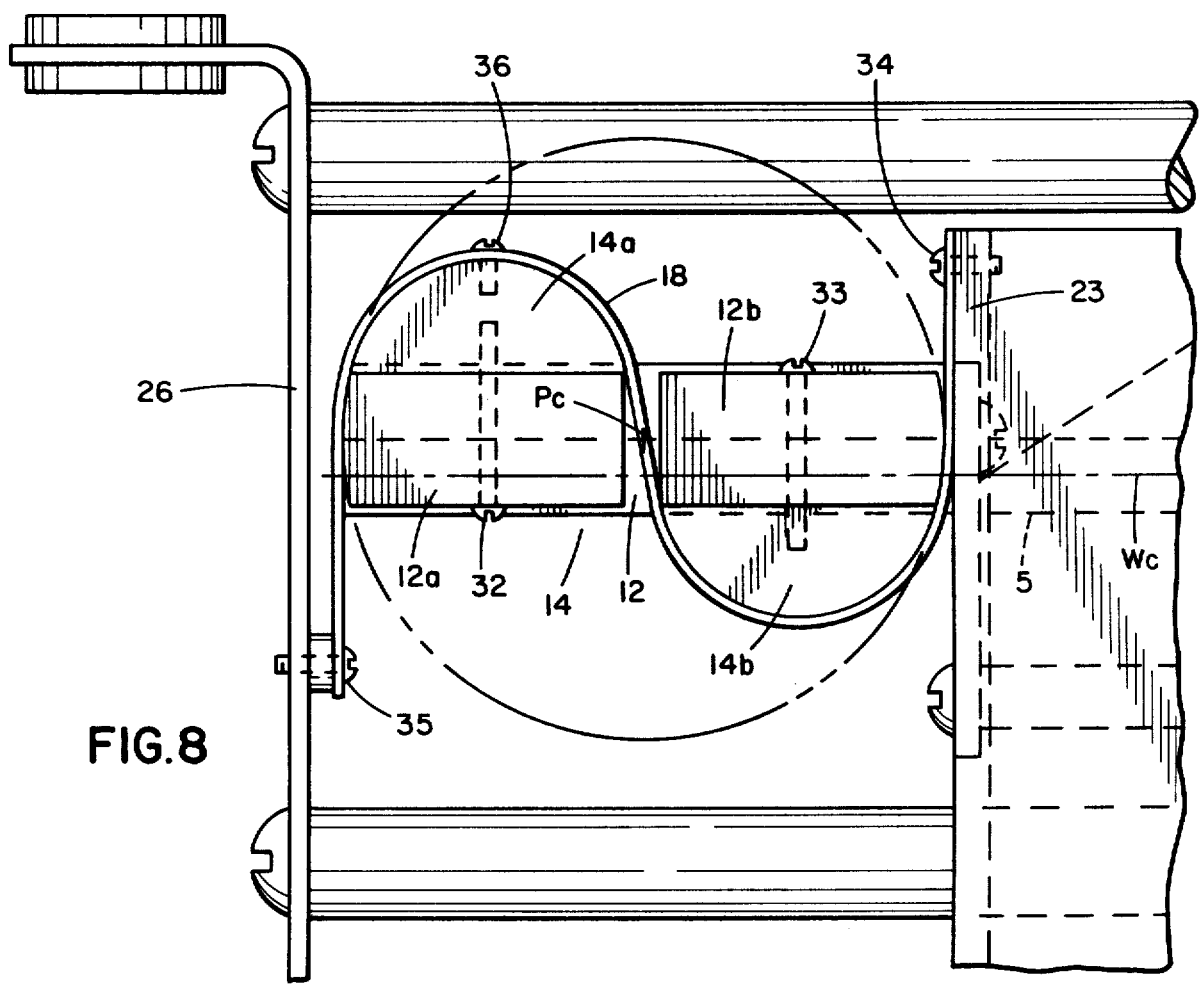

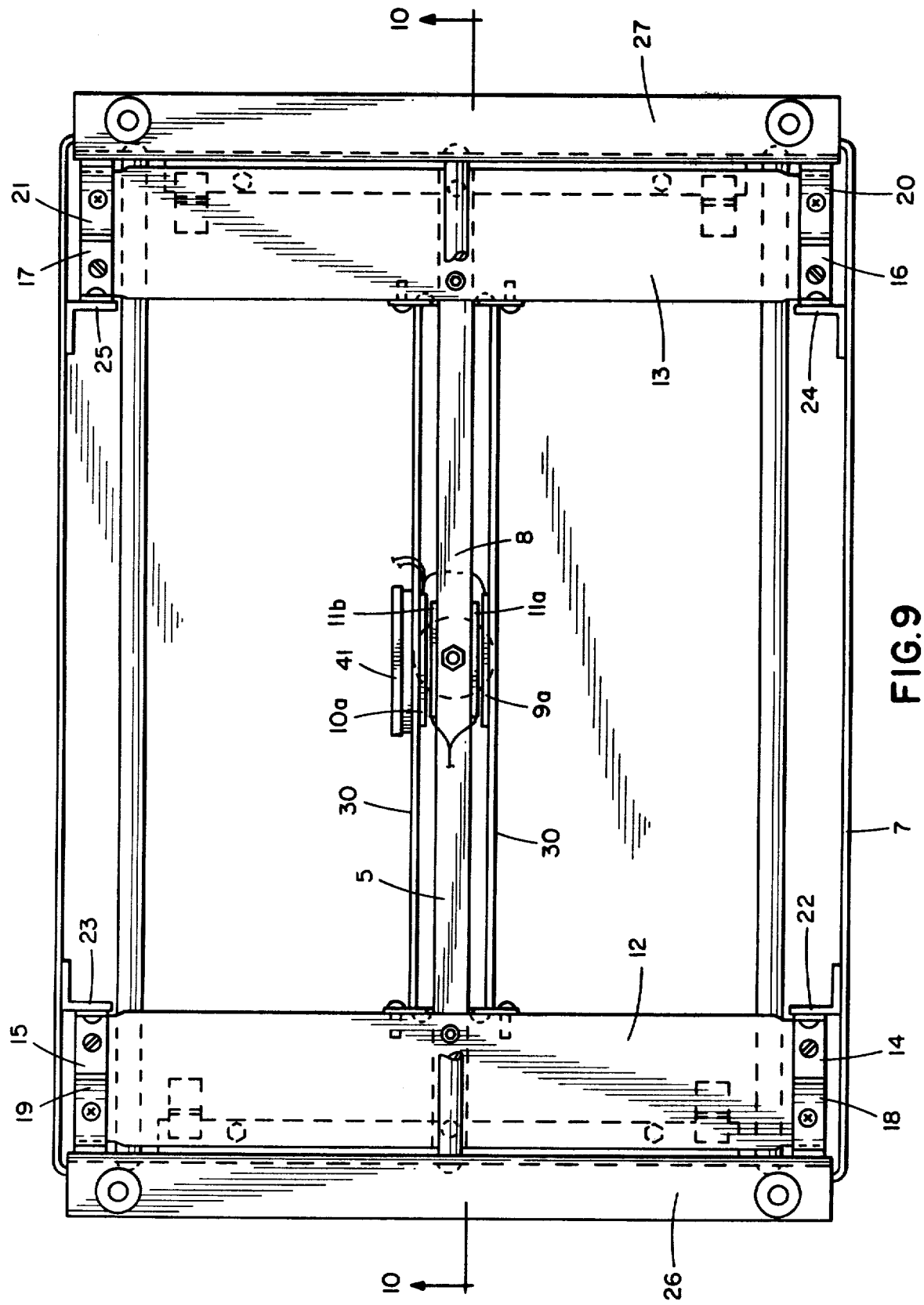

WEIGHING SCALE WITH CAPACITOR TRANSDUCER

BACKGROUND OF THE INVENTION

This invention relates to a platform weighing scale employing a differential-capacitor transducer to effect a weight readout.

Platform weighing scales employing capacitors as weight responsive transducers are known in the art. In certain scale designs, particular capacitors of the differential type are associated with the weight-readout generating circuitry. For example, U.S. Pat. No. 3,680,650 discloses a differential capacitor employed as a capacitive nulling device which is used to return the weighing transducer to a null position.

Many of the prior art scales employing capacitor transducers are highly susceptible to erroneous readings primarily because of the design of the capacitor, its associated electronic circuitry, and also the mechanism for producing weight responsive movements of the movable capacitor plates.

The inventor's U.S. Pat. No. 4,243,114 discloses the basic differential capacitor and its associated circuitry employed in the weighing scale of this invention.

BRIEF SUMMARY OF THE INVENTION

A principal object of this invention is to improve the reliability, accuracy and simplicity of weighing scales.

Another object is to improve the application of capacitor-transducers to weighing scales, and also to improve the mechanism for producing weight responsive movement of the capacitor plates.

In general, the foregoing objects are attained by a differential capacitor which employs two double-segment fixed plates each spaced from one another with one double-segment movable capacitor plate located between the fixed plates. Accordingly, the movable plate is electrically enclosed and is thus shielded from external sources of noise. Moreover, should misalignment occur in the sense that the movable capacitor plate moves closer to one double-segment fixed plate and farther away from the other fixed plate, capacitance variations are essentially cancelled out. Each of the segments of the movable plate is applied to opposite sides of an elongated, metallic, weighing beam.

The ends of the weighing beam are flexed by a tape-pulley structure which produces weight responsive turning moments which bend the beam thereby moving the movable capacitor plate in a vertical plane. The beam is enclosed within the cavity of a metallic U-shaped channel which is also supported by the tape-pulley structure. The movements of the channel are much more restricted than the center of the weighing beam. Each of the fixed plates is applied to opposite sides of the inside channel walls.

The electronic circuit arrangement incorporating the differential transducer utilizes square waves to energize the differential capacitor. The resulting square-wave output developed at the movable capacitor plate varies both in phase and amplitude in response to the relative position of the movable plate to the fixed plates.

The output signal of the differential capacitor is amplified to produce a direct-current voltage whose amplitude and polarity are accurately responsive to scale weight.

DETAILED DESCRIPTION OF THE DRAWINGS

In order that all of the features for attaining the objects of this invention may be readily understood, reference is herein made to the accompanying drawings wherein:

FIG. 7 is a fragmentary exploded view which shows the flat-spring attachment of the channel to a pivoting bar;

FIG. 8 is a fragmentary, side-elevation view of a single tape-pulley subcombination in relationship to the weighing beam;

FIG. 9 is a plan view of the weighing unit of FIG. 2 which shows details of the weighing beam and certain of the capacitor plates which comprise the differential capacitor;

DESCRIPTION OF THE PREFERRED EMBODIMENT

Figure 1:
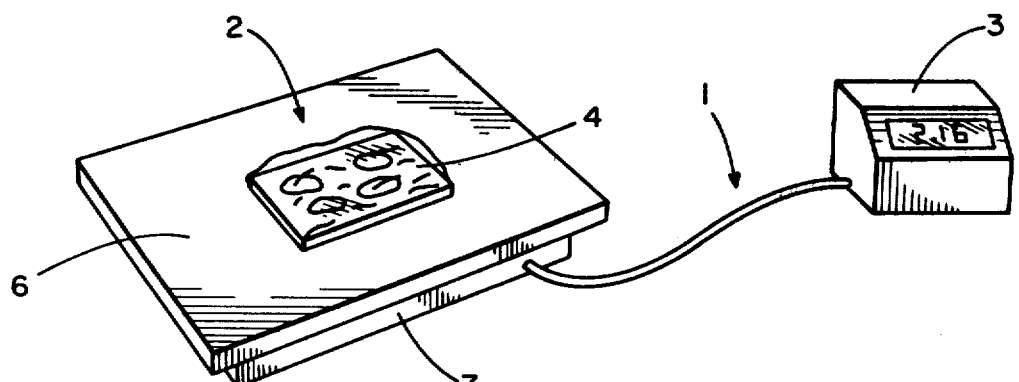
FIG. 1 is a view of the weighing scale of this invention showing the platform weighing unit in association with a digital readout module.

Referring to FIG. 1, the principal components of the platform-type weighing scale 1 to which the improvements of this invention are applied comprise platform weighing unit 2 and digital readout module 3. As is conventional in the art, item 4 to be weighed is placed on the platform of weighing unit 2 and the weight of the item is displayed digitally by module 3.

Figure 2:
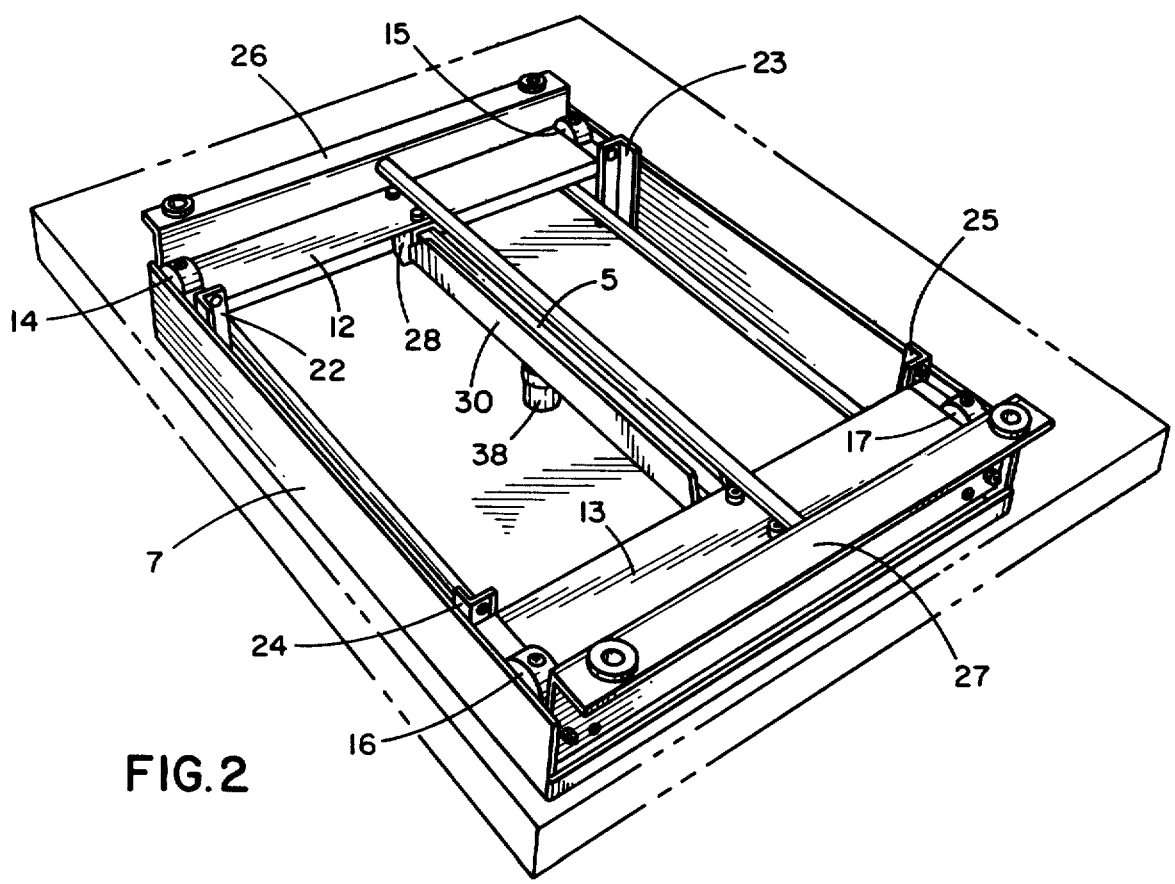
FIG. 2 is a perspective view of a first embodiment of the weighing unit (with the platform removed)
Figure 3:
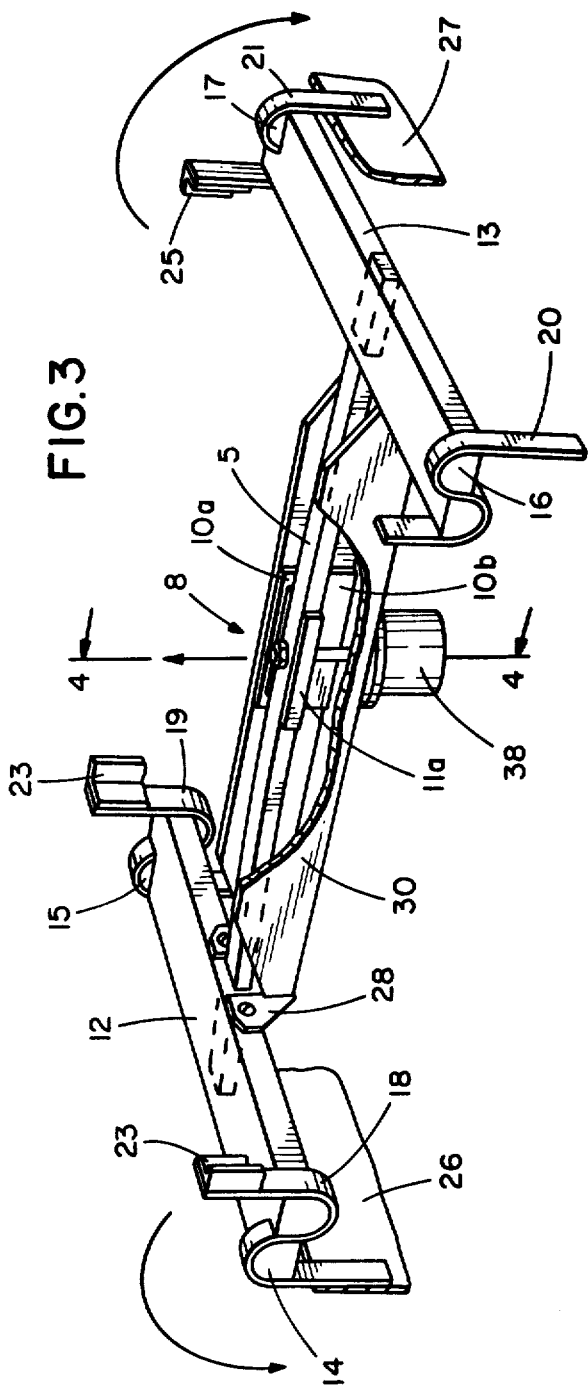
FIG. 3 is a perspective view showing the disposition of the transducer capacitor plates on the weighing beam and on the associated channel.
Figure 5:
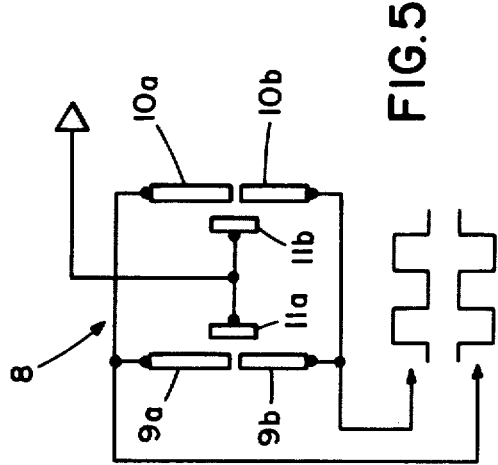
FIG. 5 is a simplified schematic diagram showing the electrical interconnection of the transducer capacitor plates.
Figure 4:
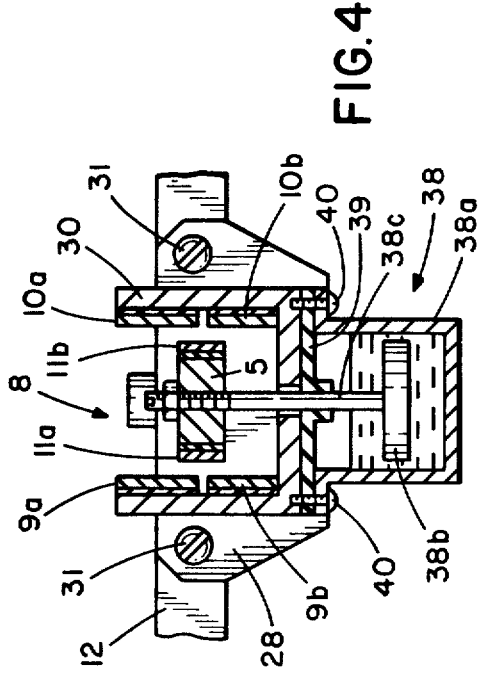
FIG. 4 is a section view taken along lines 4—4 of FIGS. 3 and 10 which shows the detailed disposition of the capacitor plates and also the attachment of the damping dashpot.

Referring to FIG. 2, a principal structural feature of this invention relates to a weighing beam 5 (FIG. 3) design by which platform 6 is movably supported relative base 7 of weighing unit 2 to effect a weight responsive change in capacitor-type transducer 8 (FIGS. 3,4,5). Transducer 8 is preferably a differential capacitor having a general construction and circuit connection (FIG. 5) as is shown in Brouwer U.S. Pat. No. 4,243,114.

The differential capacitor of transducer 8 employs two double-segment fixed plates 9 and 10 with one double-segment movable capacitor plate 11 (FIG. 4). Each of the fixed plates, 9,10 is fixed to an opposite inside wall of channel 30, and each of the movable segments 11a, 11b is fixed to an opposite side of beam 5.

In the operation of the scale, the center of beam 5 is movable in a vertical plane in response to different platform weights, and channel 30 is suspended to move to a lesser degree in the same plane. Accordingly, the relative position of the movable capacitor plate 11 to fixed capacitor plates 9,10 is altered. Specifically, movable capacitor plate 11 is elevated (FIG. 3) with respect to fixed capacitor plates 9,10.

In general, weighing beam 5 (FIG. 3) is a linear metallic beam having a rectangular cross-section which extends between and is fixed to pivoting bars 12 and 13. Bar 12 is pivoted on segmented pulleys 16 and 17. The four segmented pulleys 14, 15, 16 and 17 carry metallic tapes 18, 19, 20 and 21, respectively. The inner ends of tapes 18, 19, 20 and 21 are fixed to stationary posts 22, 23, 24 and 25 (FIGS. 2,6); and the outer ends of tapes 18 and 19 are fixed to side plate 26 and the outer ends of tapes 20 and 21 are fixed to side plate 27 (FIGS. 2,6).

Platform 6 is carried on side plates 24 and 25. When a weight 4 is placed on platform 6, pulleys 14, 15, 16 and 17 rotate (FIG. 3) and move downwardly, thereby pivoting bars 12 and 13. The pivoting of bars 12 and 13 produces a responsive flexing of weighing beam 5 which elevates the center portion of the beam.

Figure 6:
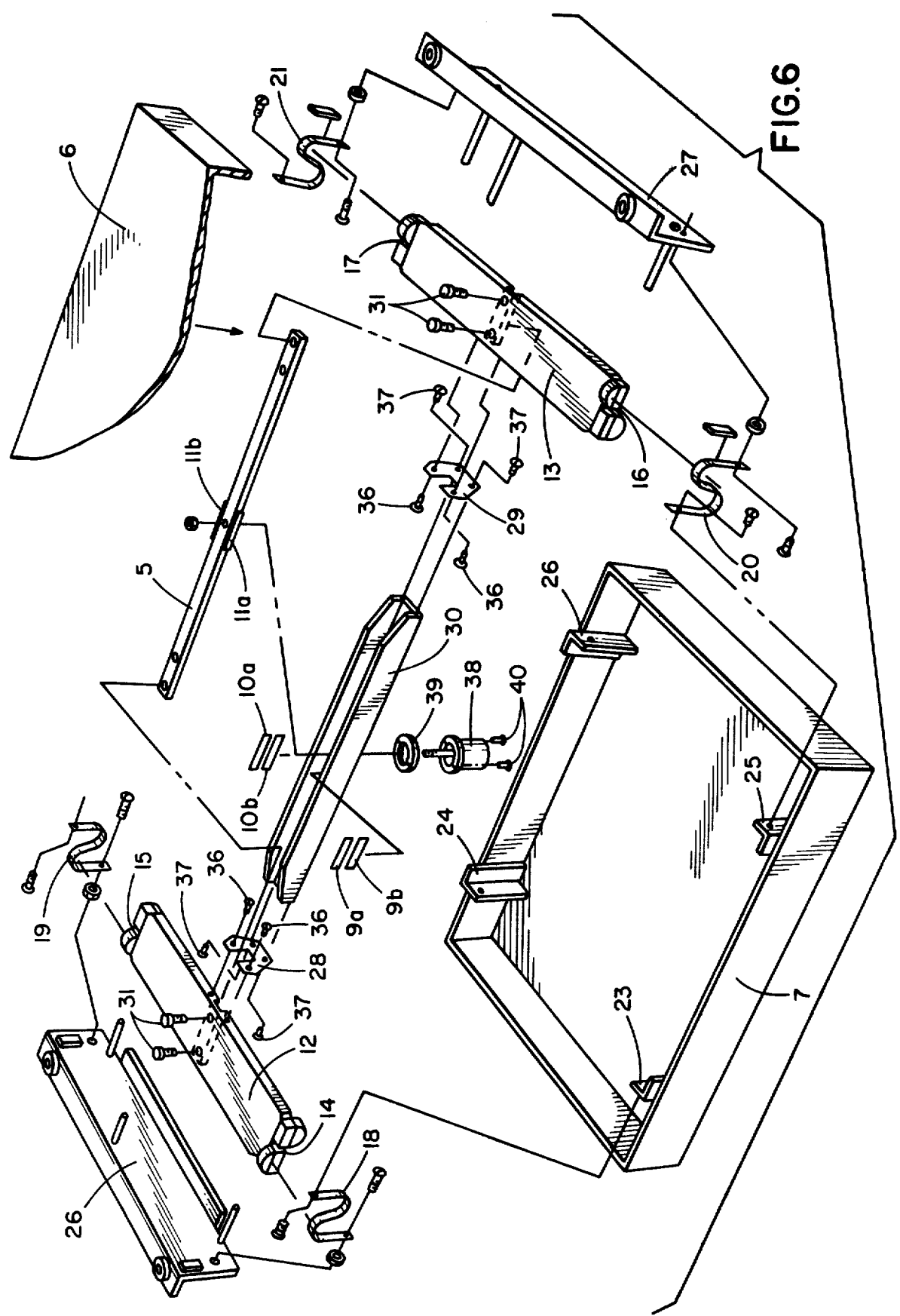
FIG. 6 is an exploded view of the components of FIG. 2.

Channel 30 extends between and is attached to pivoting bars 12 and 13 by flat springs 28 and 29 (FIGS. 3,6,7). This flat spring attachment to pivoting bars 12 and 13 limits the weight responsive movement of channel 30 compared to the center of weighing beam 5. Accordingly, differential capacitor transducer 8 produces a weight responsive change in capacitance which produces a weight readout at module 3 (FIG. 1).

For relatively small pivoting angles of pulleys 14, 15, 16 and 17, the displacement of the center portion of weighing beam 5 with respect to adjacent channel 30 is reliably proportional to the weight measured. Accordingly, the weighing beam mechanism of this invention represents a simplified structure for translating the movement of a tape-pulley supported weighing platform into weight readings by translating changes in capacitance of transducer capacitor 8 to a weight readout.

The detailed construction of the weighing scale is as follows:

The undersides of metal pivoting bars 12 and 13 are slotted to receive the adjacent ends of metal weighing beam 5 (FIGS. 3,6 and 8). Bolts 31 fix beam 5 rigidly to pivoting bars 12 and 13 (FIGS. 2,6). For optimum accuracy, it is desirable that each pulley center $P_c$ of segmented pulleys 14, 15, 16 and 17 be located above the longitudinal centerline $W_c$ of weighing beam 5 in the unstressed condition (FIG. 8).

Each of pulleys 14, 15, 16 and 17 is identical in construction and may be best described with reference to typical pulley 14 shown in FIG. 8. Pulley 14 comprises two semi-circular segments 14a and 14b which are fixedly attached to pivoting bar projections 12a and 12b by screws 32 and 33, respectively.

Metallic tape 18 is carried on the curved surfaces of pulley segments 14a and 14b, and the right end of metallic tape 18 is attached to stationary post 23 by screw 34. The left end of the tape is attached to side plate 26 by screw 35.

Figure 10:
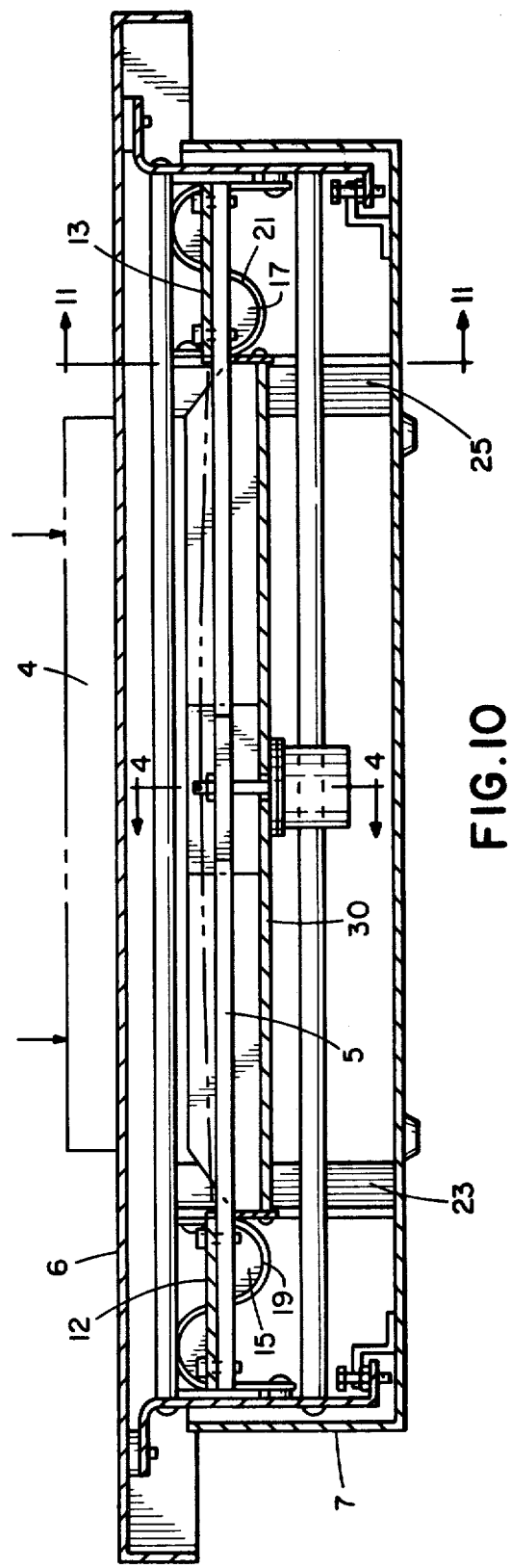
FIG. 10 is a section view taken along line 10—10 of FIG. 9.
Figure 11:
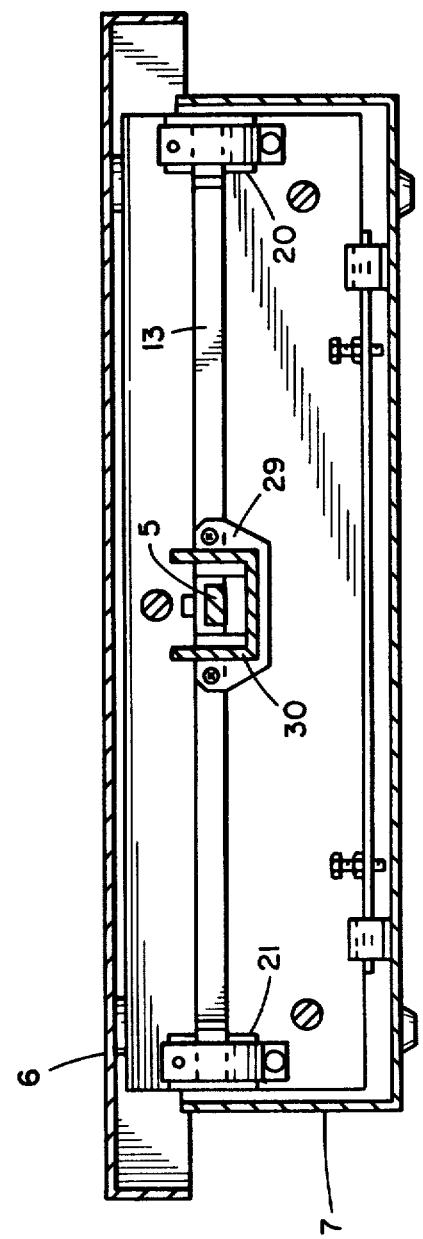
FIG. 11 is a section view taken along line 11—11 of FIG. 10.

Platform 6 is carried on two side plates 26 and 27 (FIGS. 6,10,11). Accordingly, the four pulleys 14, 15, 16 and 17 support the platform by side plates 26,27 which are coupled to metallic tapes 18, 19, 20 and 21 which are in turn fixed to stationary posts 22, 23, 24 and 25. Each of the pulleys is free to rotate on its pulley center $P_c$ in response to changes in platform weight. This produces a composite pulley rotation and downward movement of all pulleys, which in turn causes a responsive rotation or pivoting of bars 12 and 13 through a minute angle. The direction of rotation of the pulleys and their connected pivoting bars is in the direction of the curved arrows shown in FIG. 3. The construction of the segmented pulleys is greatly simplified because the limited angular movement eliminates the necessity for full 360 degree curved pulley surfaces. Tape 18 is fixed to pulley 14 by a single screw 36.

The pulley construction shown in the drawings is a preferred design. Other pulley configurations which are commonplace in the scale art may be used, provided that the necessary composite motion can be attained.

Weighing beam 5 extends between pivoting bars 12 and 13 nested within the cavity of U-shaped channel 30. Additionally, channel 30 extends between pivoting bars 12 and 13. Because the weighing beam is rigidly attached to pivoting bars 12 and 13 by screws 31 (FIG. 6), and channel 30 is flexibly attached to pivoting bars 12 and 13 by flat springs 28 and 29, the weight responsive rotation of pivoting bars 12 and 13 produces a difference in the movements of the center of weighing beam 5 in a vertical plane relative channel 30. The movement difference is weight-responsive. Each of flat springs 28,29 is attached to its associated pivoting bar 12,13 by a set of screws 36 and to channel 30 by a set of screws 37.

Transducer 8 (FIGS. 3,4,5) comprises a differential capacitor having six copper plate segments which are electrically connected as is shown in FIG. 5 and insulator supported on the surfaces of channel 30 and weighing beam 5. In particular, movable plate segments 11a and 11b are insulator attached to opposite vertical sides of the rectangular weighing beam 5. These plates are fixed symmetrically to, but insulated from, the centermost portion of the beam.

A first inside wall of channel 30 carries two segments 9a and 9b of the double-segment fixed plate 9. Fixed segments 9a and 9b are electrically isolated from one another as is shown in FIGS. 4 and 5, with the adjacent movable plate segment 11a being symmetrically disposed between the two segments 9a and 9b. Similarly, two copper segments 10a and 10b which comprise double-segment fixed plate 10, are disposed on the opposite vertical side wall of channel 30 in a similar arrangement to that previously described with respect to fixed plates 9a, b and movable plate segment 11a. As is set forth in Brouwer U.S. Pat. No. 4,243,114, segments 9a and 10a are electrically connected one to the other; and similarly, segments 9b and 10b are electrically connected one to the other.

A source of square waves, namely, a square-wave oscillator generator, applies square-wave signals of opposite phase to the multiple connection for segments 9a, 10a, as compared to that applied to the multiple connection for segments 9b, 10b. As is set forth in detail in the Brouwer patent, weight responsive variations in the vertical movement of movable capacitor plate 11 relative fixed plates 9 and 10 produce a variation in differential capacitance which is translated by electronical circuitry shown in the Brouwer patent into a highly accurate weight readout.

It is desirable that the pivoting motion of bars 12 and 13 be damped to prevent a fluctuating readout. This is accomplished by dashpot 38 which includes a cylinder 38a which contains piston 38b. Dashpot 38 is seated on the underside of channel 30 on ring 39 both of which are attached to the channel by screws 40. Piston rod 38c extends through ring 39 and is fixed to weighing beam 5. Accordingly, the bending movements of weighing beam 5 are damped by typical dashpot action and a relatively constant non-fluctuating readout is provided.

As is shown in FIG. 9, a preamplifier comprising solid-state electronic circuitry is housed within module 41. Module 41 is attached to the outside wall of channel 30. This close location of circuit module 41 to transducer 8 enables a short connection of the transducer plates 9, 10 and 11 to the necessary amplifier circuitry.

It should be understood that the above-described structure is merely illustrative of a preferred embodiment incorporating the principles of this invention. Modification can be made without departing from the scope of the invention.

What is claimed is:

1. In a weighing scale, the improvement comprising: an elongated weighing beam, turning means attached to the ends of the beam to flex the center portion of the beam responsively to weight variations on the scale, elongated capacitor plate support means positioned adjacent the weighing beam with its ends being coupled to the turning means so that the support means moves less responsively than the center of the beam to weight variations, and a capacitor transducer having at least one relatively movable plate coupled to a mid-portion of the weighing beam and one relatively fixed plate coupled to the capacitor plate support means adjacent the movable plate whereby capacitance variations are weight responsive.

2. The combination of claim 1 in which the capacitor transducer includes a single movable double-segment plate coupled to the weighing beam with both segments being electrically connected one to the other, and two double-segment fixed plates with the two plates disposed in a parallel relationship to one another with adjacent segments of each plate being electrically connected one to the other.

3. The combination of claim 1, in which the capacitor-plate support means partially envelopes the center portion of the weighing beam on at least two sides, and a second fixed capacitor plate with both fixed plates having at least one fixed plate segment disposed on opposite sides of the center portion of the weighing beam.

4. The combination of claim 3 in which each fixed plate includes a pair of isolated segments in a common plane.

5. The combination of claim 4 in which the movable plate includes two spaced segments each located on opposite sides of the weighing beam with each movable plate segment being adjacent a fixed plate to define thereby a differential capacitor.

6. The combination of claim 5 in which the capacitor-plate-support means is a generally U-shaped channel having spaced sidewalls connected by a base to define a channel cavity which houses the load beam.

7. The combination of claim 6 in which the two fixed plates are coupled to different sidewalls.

8. The combination of claim 3 in which the turning means includes a pair of spaced pivoting bars, and the means coupling the ends of the elongated capacitor plate support means is a pair of flexible elements each attached to a different pivot bar and the adjacent end of the capacitor plate support means.

9. The combination of claim 8 in which the flexible elements are flat springs.

10. The combination of claim 8 in which the turning means includes a pair of tape pulleys upon which the pivoting bars are supported.

* * * * *